(12) United States Patent
Grable

(10) Patent No.: US 9,475,415 B2
(45) Date of Patent: Oct. 25, 2016

(54) HEADREST DUMP ASSEMBLY WITH BOTH CABLE AND PUSH BUTTON ACTUATION

(71) Applicant: BAE Industries, Inc., Warren, MI (US)

(72) Inventor: David M. Grable, Clinton Township, MI (US)

(73) Assignee: BAE Industries, Inc., Auburn Hills, MI (US)

( * ) Notice: Subject to any disclaimer, the term of this patent is extended or adjusted under 35 U.S.C. 154(b) by 0 days.

(21) Appl. No.: 14/660,996

(22) Filed: Mar. 18, 2015

(65) Prior Publication Data
US 2015/0266401 A1 Sep. 24, 2015

Related U.S. Application Data

(60) Provisional application No. 61/954,940, filed on Mar. 18, 2014.

(51) Int. Cl.
*A47C 7/38* (2006.01)
*B60N 2/48* (2006.01)

(52) U.S. Cl.
CPC ........... *B60N 2/4844* (2013.01); *B60N 2/4855* (2013.01)

(58) Field of Classification Search
CPC . B60N 2/4844; B60N 2/4852; B60N 2/4855
USPC .................................................. 297/61, 408
See application file for complete search history.

(56) References Cited

U.S. PATENT DOCUMENTS

| 5,228,749 | A | * | 7/1993 | Harrell | B60N 2/4847 297/408 X |
|---|---|---|---|---|---|
| 5,236,245 | A | * | 8/1993 | Harrell | B60N 2/4847 297/408 X |
| 5,236,246 | A | * | 8/1993 | Harrell | B60N 2/4847 297/408 X |
| 5,238,295 | A | * | 8/1993 | Harrell | B60N 2/4847 297/408 X |
| 5,681,079 | A | * | 10/1997 | Robinson | B60N 2/3013 297/61 X |
| 5,738,412 | A | * | 4/1998 | Aufrere | B60N 2/4847 297/408 X |
| 7,717,516 | B2 | | 5/2010 | Sutter, Jr. et al. | |
| 8,083,291 | B2 | | 12/2011 | Yoshida | |
| 8,146,998 | B2 | | 4/2012 | Jammalamadaka et al. | |
| 8,197,001 | B2 | | 6/2012 | Grable et al. | |
| 8,511,751 | B2 | | 8/2013 | Bruck | |
| 8,979,203 | B1 | * | 3/2015 | Sutter, Jr. | B60N 2/4844 297/408 |

(Continued)

*Primary Examiner* — Rodney B White
(74) *Attorney, Agent, or Firm* — Dinsmore & Shohl LLP; Douglas J. McEvoy

(57) ABSTRACT

An assembly embedded into a headrest bun for permitting rotation of the bun between upright design and forward dump positions. The assembly includes a pair of tubes extending upwardly from a seatback frame and a fixed pivot rod extending between the tubes. A housing defines a package containing interior and including a pair of front and rear covers assembleable around the fixed pivot rod. A block shaped cam wedge is displaceably supported within the interior and biased in a first direction in seating fashion against an abutting location of the fixed rod. An actuating mechanism elevates the cam wedge to unseat from the pivot rod, the housing subsequently rotating from the design position to the forward dump position.

21 Claims, 7 Drawing Sheets

(56) References Cited

U.S. PATENT DOCUMENTS

| | | | |
|---|---|---|---|
| 2004/0108766 A1* | 6/2004 | Baker | B60N 2/4844 297/408 |
| 2005/0029853 A1* | 2/2005 | Gauthier | A47C 7/38 297/408 |
| 2005/0067874 A1* | 3/2005 | Kamrath | B60N 2/4858 297/408 |
| 2005/0088027 A1* | 4/2005 | Yetukuri | B60N 2/4817 297/408 |
| 2006/0061187 A1* | 3/2006 | Gauthier | A47C 7/38 297/408 |
| 2007/0170766 A1* | 7/2007 | Brawner | B60N 2/4844 297/408 |
| 2007/0236070 A1* | 10/2007 | Brockman | B60N 2/43 297/408 |
| 2008/0277989 A1* | 11/2008 | Yamane | B60N 2/43 297/408 |
| 2009/0021068 A1* | 1/2009 | Yamane | B60N 2/4808 297/408 |
| 2010/0078972 A1 | 4/2010 | Sayama | |
| 2010/0117432 A1* | 5/2010 | Lutzka | B60N 2/4858 297/408 |
| 2010/0133889 A1* | 6/2010 | Lutzka | B60N 2/3009 297/408 |
| 2010/0283305 A1* | 11/2010 | Yetukuri | B60N 2/4844 297/408 |
| 2010/0327645 A1* | 12/2010 | Jeong, II | B60N 2/4808 297/408 |
| 2011/0095592 A1* | 4/2011 | Willard | B60N 2/4844 297/408 |
| 2012/0068517 A1* | 3/2012 | Yetukuri | B60N 2/4847 297/408 |
| 2013/0134761 A1* | 5/2013 | Willard | B60N 2/4855 297/408 |
| 2013/0140866 A1* | 6/2013 | Yetukuri | B60N 2/4844 297/408 |
| 2014/0203615 A1* | 7/2014 | Little | B60N 2/4808 297/408 |
| 2014/0265507 A1 | 9/2014 | Fredriksson et al. | |
| 2015/0232002 A1* | 8/2015 | Little | B60N 2/4844 297/408 |
| 2015/0367764 A1* | 12/2015 | Laperriere, III | B60N 2/4847 297/408 |

* cited by examiner

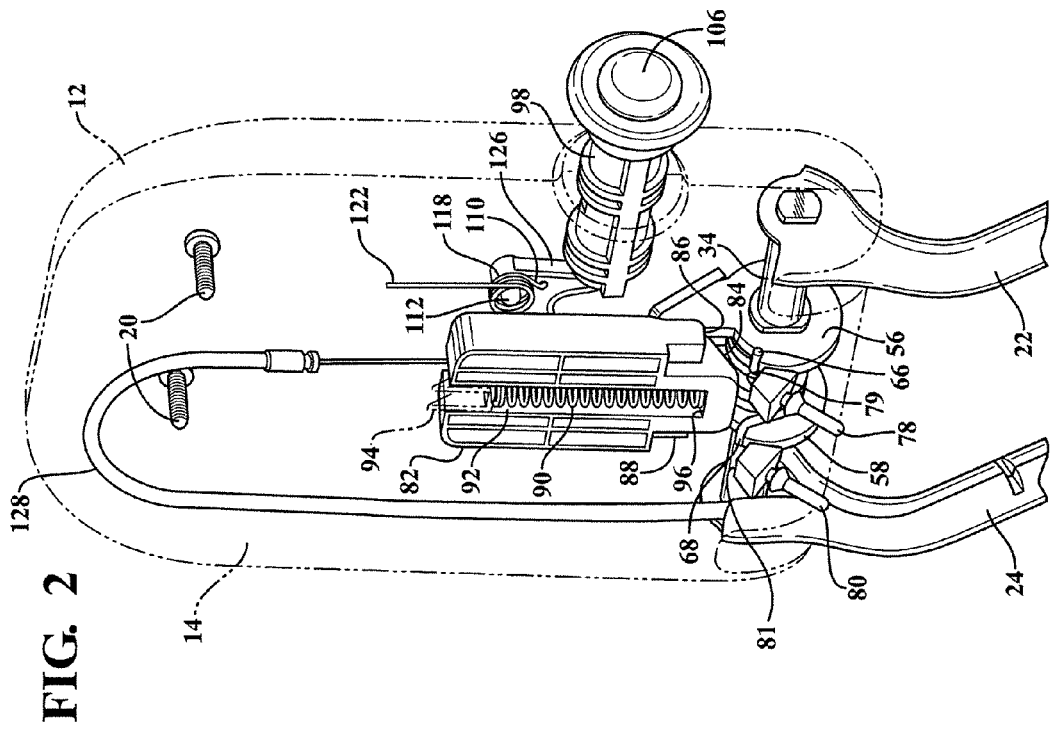
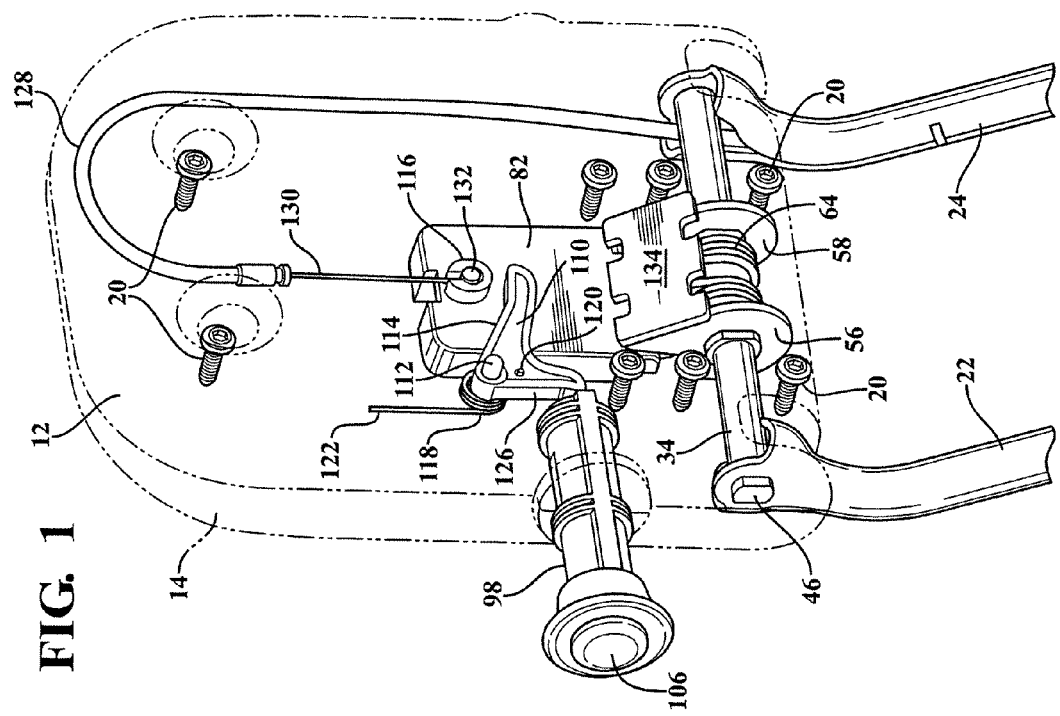

HEADREST DUMP ASSEMBLY WITH BOTH CABLE AND PUSH BUTTON ACTUATION

CROSS-REFERENCE TO RELATED APPLICATIONS

This Application claims the benefit of U.S. Provisional Application 61/954,940 filed on Mar. 18, 2014, the contents of which are incorporated herein in its entirety.

FIELD OF THE INVENTION

The present invention relates generally to a headrest for a vehicle seatback. More specifically, the present invention discloses a headrest actuating mechanism which is integrated into a housing package, in turn embedded into a headrest bun. The headrest provides for either button or cable actuation of a lever incorporated into the headrest package, in turn elevating a cam wedge against its spring bias and out of contact with a fixed pivot rod, resulting on spring actuated forward dumping motion. A pair of sectors is mounted to the fixed pivot rod and are configured to guide an underside of the cam wedge. A flat rear surface of each sector further defines an abutment stop when contacted by a pair of rubberized or otherwise force absorbing mounting portions secured to such as a rear cover portion of the package defining housing.

BACKGROUND OF THE INVENTION

The prior art is documented with examples of vehicle head restraints with some form of latch or trigger release which permits the headrest to pivot relative to an uppermost location of a supporting seatback. A first example of this is the vehicle head restrain with electromagnetic locking and latch release mechanism of Fredriksson, US 2014/0265507. The electromagnetic mechanism is selectively moveable between a locked and an unlocked position, thereby allowing the head restraint to move between an upright and a folded position. The locked position includes engagement of a first lock member with a second lock member to prevent rotation of the head restraint relative to a base portion of the head restraint and the unlocked position includes disengagement of the first lock member from the second lock member to allow rotation of the head restraint relative to the base portion. An electromagnet is operatively connected to the head restraint and positioned to exert a magnetic force on the second lock member that urges the second lock member toward the unlocked position when the electromagnet is in an energized condition.

U.S. Pat. No. 8,197,001, to Grable, teaches a pivoting headrest assembly incorporated into a rear row vehicle seat including a base and a pivotally supported seatback. A first bracket is fixedly supported atop the seatback and exhibits a striker. A second bracket is pivotally supported to the first bracket in a biased direction away from the striker and includes a headrest bun support. A hook is supported upon the second bracket in a first biased direction engaging the striker. A release element associated with the second bracket is biased direction and which, upon being actuated in a second counter-biased direction, engages a projecting portion associated with the hook. A cable is secured at a first end to a fixed location associated with the seat and extends through a redirection location an offset distance from a pivot location of the seatback, the cable securing at a second end to the release element.

Sutter, Jr., U.S. Pat. No. 7,717,516, teaches an articulating/folding head restraint head restraint assembly that includes modular brackets that function as modules and allow for platform-ability and customization by varying auxiliary components. The modular brackets can be molded or cast using conventional manufacturing processes, and are designed to receive and/or house various components of the assembly such as pivotal head restraint supports, pivotal shafts, locking assemblies, etc. The modular brackets are designed to integrate a number of components that are typically separate in prior art devices and have to be individually assembled together.

U.S. Pat. No. 8,146,998, to Jammalamadaka, teaches a vehicle head restraint including a head restrain frame having at least one post for attaching the head restraint to a seat back. The head restraint is pivotable relative to the post and also includes a spring clip attached to the head restraint frame and a strop rigidly held relative to the post, such that the stop contacts the spring clip when the head restraint is in the upright position.

Sayama, US 2010/0078972, teaches a headrest that can be tilted from a head support state to a storage state by an operation at a position separate from the headrest, and an associated vehicle seat. The headrest includes a pillar mounted on the upper part of the seat back; a headrest frame turn-ably engaged with the pillar; a spring that urges the headrest frame to one side; a locking element or elements that hinder turning the headrest frame with respect to the pillar; a remote control section provided at a position separate from the headrest; and an inner cable one end part of which is connected to the locking element and the other end part of which is attached to the remote control section. The locking element or elements release by pulling the inner cable by the operation of the remote control section.

Finally, Yoshida U.S. Pat. No. 8,083,291 teaches a vehicle seat having a seat back, a seat bottom, and a headrest mounted on an upper portion of the seat back. The headrest includes a reverse U-shaped support section having downwardly extending two pillars and a horizontal section which connects upper portions of the pillars with each other. A lock plate is fixed to the horizontal section. A headrest frame is provided with an engagement disk which is changed over between a lock position where the engagement disk engages with the lock plate to disable the headrest to rotate about the horizontal section, and an unlock position where the engagement disk disengages from the lock plate to enable the headrest to rotate around the horizontal section.

SUMMARY OF THE INVENTION

The present invention discloses an assembly embedded into a headrest bun for permitting rotation of the bun between upright design and forward dump positions. The assembly includes a pair of tubes extending upwardly from a seatback frame and a fixed pivot rod extending between the tubes.

A housing defines a package containing interior and including a pair of front and rear covers assembleable around the fixed pivot rod. A block shaped cam wedge is displaceably supported within the interior and biased in a first direction in seating fashion against an abutting location of the fixed rod. An actuating mechanism elevates the cam wedge to unseat from the pivot rod, the housing subsequently rotating from the design position to the forward dump position. Additional features include upper ends of the tubes seating through underside accessible arcuate channels defined in the assembleable covers, permitting the housing to rotate relative to the pivot rod.

Other features include a pair of sectors mounting to the pivot rod, a torsion spring seated over a central portion of the pivot rod and captured between the sectors, such that angled ends of the spring engage abutment shoulders configured upon the sectors. The sectors further exhibit flat rear surfaces defining abutment stops when contacted by a pair of rubberized force absorbing mounting portions, these in turn secured in angled fashion to the rear cover portion of the package defining housing so that generally planar shaped pad ends of the force absorbing portions rotate with the forwardly dumping headrest until contacting the flat rear surfaces of the sectors.

The cam wedge further includes a lower profile edge which, in a downwardly biased position, contacts an inside flattened profile depicted along a central area of the pivot rod. The cam wedge further has a pair of underside configured and side edge proximate locations configured to seat against and slide along arcuate outer profiles of the sectors during each of rotation of the headrest to the forward dump position and manually induced and counter-biased upright retraction back to the design position.

A coil shaped compression spring seats within a rear side vertical channel defined in the cam wedge. An upper end of the compression spring abuts an inwardly projecting end stop associated with the package defined interior and so that an opposite bottom end of the spring biases against a lower end surface of the channel defined in the cam wedge in order to bias the cam wedge in a normally downward and engaged position against the flattened central profile of the fixed pivot rod.

Additional features associated with the actuating mechanism further include a tubular shaped housing mounted to a side location of the package defining housing, a stem-shaped portion being seated in limited linearly displaceable fashion within an open interior of the outer tubular housing and including a flattened outer button depressing end and an inner engaging end. A release lever exhibits a modified "L" shape and is pivotally mounted by a pin within the package defined interior at a location in which a generally upper facing profile surface of the lever is in contact with a location projecting from a front face of the cam wedge.

A torsion spring seats over the pin and includes a lower end which engages the lever, an upper end of the spring engaging a surface of the package defined interior to bias the lever away from the projecting portion. Upon inwardly displacing the stem-shaped portion, the inner end contacts a further side disposed surface of the lever, at which point continued inner displacement of the stem portion rotates the lever against its bias and so that the upper lever surface engages the projecting portion of the cam wedge and forcibly elevates the cam wedge against the bias exerted by its compression spring.

Other features associated with the actuating mechanism further include provision of a cable exhibiting an outer sleeve extending in an overhead extending and reverse-looped fashion within the inner package defining space of the assembled housing. An inner linearly displaceable portion extends from an end of the outer sleeve and in turn engages the projection upon the cam wedge. Vertical actuation of the cam wedge, such as from a remote location, triggers rotation of the headrest to the dump position. Other features include a load dispersion plate which is generally angularly disposed and which is mounted to a lower inside location of a selected interior package defining cover, such that the plate rotates with the housing and, in combination with the architecture of the sectors, prevents chucking of the package assembly during both forward dump and manual upright retraction.

BRIEF DESCRIPTION OF THE DRAWINGS

Reference will now be made to the attached drawings, when read in combination with the following detailed description, wherein like reference numerals refer to like parts throughout the several views, and in which:

FIGS. 1 and 2 are corresponding front and rear perspectives of the headrest assembly, depicting the interior packaging defining front and rear covers in see through fashion in order to illustrate the latch assembly package, including both button and cable actuating protocols, the headrest being depicted in an upright design position;

DETAILED DESCRIPTION OF THE PREFERRED EMBODIMENTS

As previously described, the present invention discloses a headrest actuating mechanism which is integrated into a housing package in turn embedded into a headrest bun. As will be described in further detail, the headrest provides for either button or cable actuation of a lever incorporated into the headrest package, in turn elevating a cam wedge against its spring bias and out of contact with a fixed pivot rod, and resulting on spring actuated forward dumping motion. As will be further described, a pair of sectors are mounted to the fixed pivot rod and are configured to guide an underside of the cam wedge. A flat rear surface of each sector further defines an abutment stop when contacted by a pair of rubberized or otherwise force absorbing mounting portions secured to such as a rear cover portion of the package defining housing.

Figure 3:
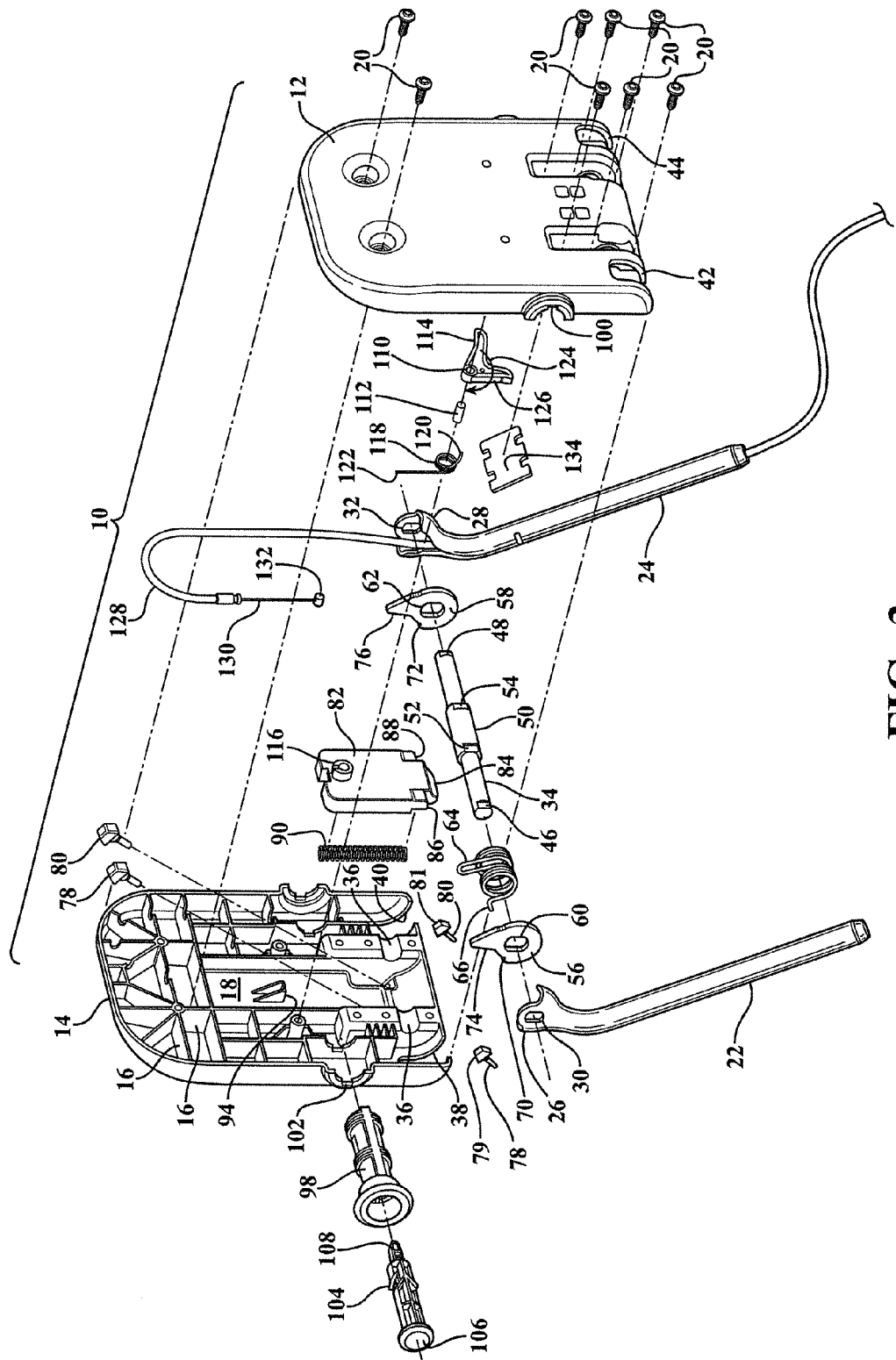
FIG. 3 is an exploded view of the headrest assembly.

Referring initially to the front and rear perspectives of FIGS. 1 and 2, these in combination with the exploded view of FIG. 3, the headrest assembly is depicted (generally at 10 in FIG. 3) includes a housing having a pair of front 12 and rear 14 covers, these exhibiting half-bodies which are assembleable so that inner structurally supporting locations (see at 16 for cover 14 in FIG. 3) combine with interior defined spaces (further at 18) to collectively define a package receiving interior upon assembling the front and rear covers, such as via the use of screw fasteners 20. The front and rear assembleable covers 12 and 14 are further depicted in generally see through fashion in the remaining illustrations, this in order to illustrate the latch assembly package, including both button and cable actuating protocols.

In the initial front and rear perspective view of FIGS. 1 and 2, the headrest 10 is depicted in an upright design position. As further supported by FIG. 3, a pair of headrest tubes 22 and 24, extend upwardly from a seatback frame (not shown), the tubes including arcuate configured upper ends 26 and 28 through which are defined aligning apertures 30 and 32 (FIG. 3), respectively.

A pivot rod 34 is provided and which is supported at configured lower width extending interior locations defined by the assembleable covers 12 and 14 (see at 36 defined upon inner assembleable packaging for cover 14 in FIG. 3), these located proximate the lower ends of the assembled housing. As is shown by selected interior of half cover 14, the structurally supporting locations 16 are distributed such that the interior architecture of the sandwich assembled covers 12 and 14 provides package retaining support for the various components of the assembly in the manner described herein.

The rod 34 further seats through the apertures 30 and 32 defined at the upper ends 26 and 28 of the rods 22 and 24, the rod ends 26 and 28 seating through underside accessible arcuate channels defined in the assembleable covers (see at 38 and 40 for cover 14 in FIG. 3 as well as further at 42 and 44 for opposing assembleable cover 12), this so that the headrest 10 with package defining assembled covers 12 and 14 can rotate relative to the pivot rod 34 which is fixed between the headrest tubes 26 and 28. As further best shown in FIG. 3, the headrest rod 34 further exhibits notched ends 46 and 48 which seat within mating profiles of the tube end apertures 30 and 32, the rod 34 also having a central portion 50 with a flattened vertical surface profile and also exhibiting an additional pair of intermediate disposed notched locations 52 and 54.

A pair of sectors 56 and 58 are provided with keyed interior apertures 60 and 62 (again FIG. 3) for mounting over the ends of the pivot rod 34 and so that the keyed aperture 60 and 62 align and seat over the notched intermediate locations 52 and 54 of the rod 34, these defining intermediate ends of the central portion 50. A torsion spring 64 is seated over the central portion 50 of the pivot rod 34 and captured between the sectors 56 and 58, such that angled ends (see at 66 and 68 in FIGS. 2 and 3) of the spring 64 engage abutment shoulders (further at 70 and 72) of the sectors 56 and 58.

The sectors 56 and 58 further depict flat rear surfaces 74 and 76, these defining abutment stops when contacted by a pair of rubberized stops, also termed force absorbing mounting portions, and further shown at 78 and 80. The rubberized stop 78 and 80 can be secured to such as a rear cover portion of the package defining housing in an angled fashion so that generally planar shaped pad ends (see as again best shown in FIG. 3 at 79 and 81) of the force absorbing portions 78 and 80 rotate with the forwardly dumping headrest (further described in reference to FIGS. 6-8) until they come into contact with the fixed flat rear surfaces 70 and 72 of the rod mounted sectors 56 and 58.

Figure 8:
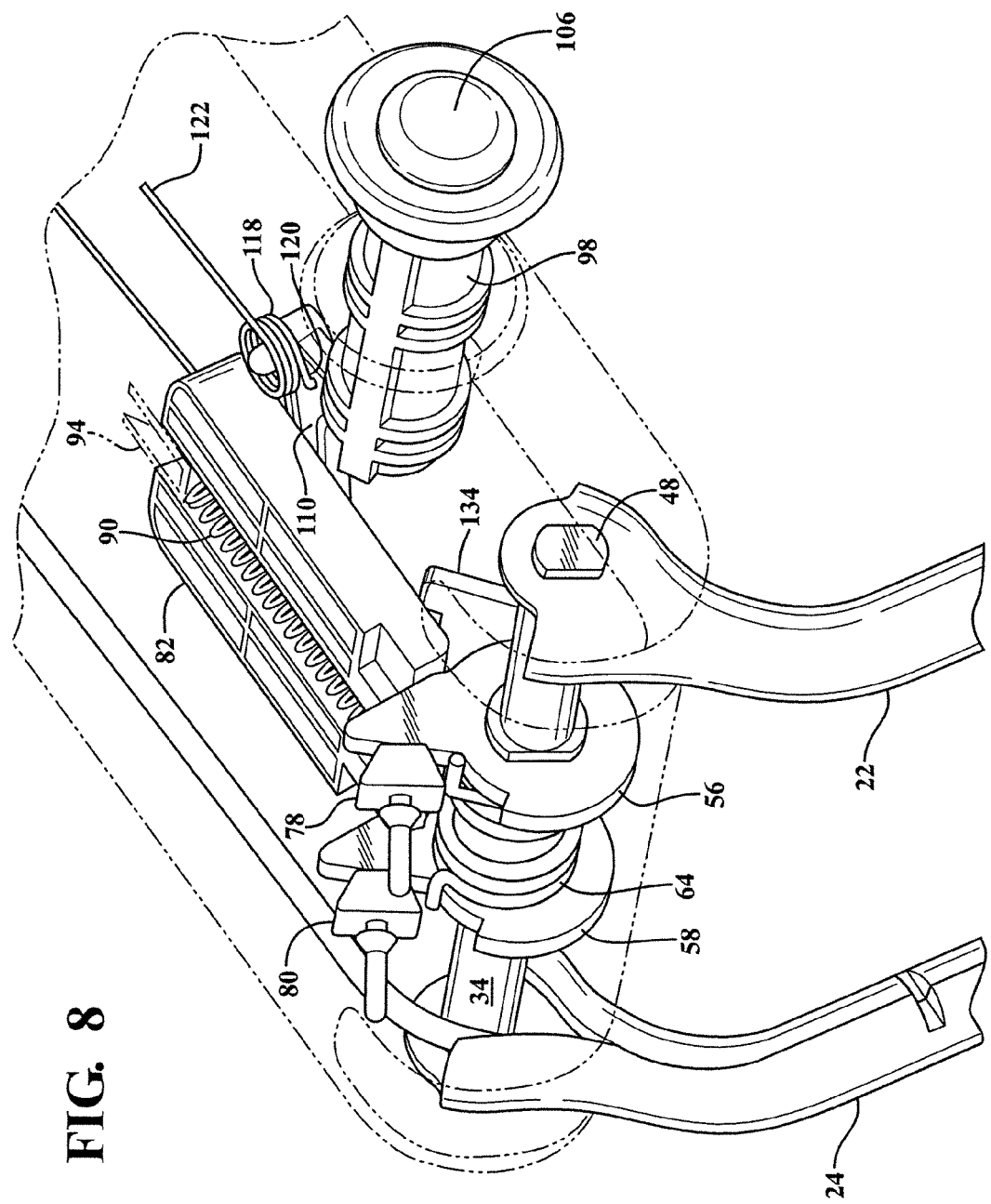
FIG. 8 is a further rear perspective of the headrest assembly in fully forward rotated dump position in which a flat rear surface of each sector further defines an abutment stop when contacted by a pair of rubberized or otherwise force absorbing mounting portions secured to such as a rear cover portion of the package defining housing.

As previously described, rotation of the headrest assembly 10 from the design position of FIGS. 1-2 to the forward dump position of FIG. 8 is initiated and guided by a generally rectangular and three dimensional planar shaped (generally block-shaped) cam wedge 82 which is vertically displaceably supported within the interior space previously depicted at 18 in reference to inside of rear cover 14 in FIG. 3. The block shaped cam wedge 82 exhibits a lower profile and angled edge 84 which, in a downwardly biased position, contacts the inside flattened profile of the central area 50 of the pivot rod 34 (to maintain the assembly in the upright design position).

A pair of underside configured and side edge proximate locations, see further at 86 and 88, of the cam wedge 82 are further configured to seat against and slide along the arcuate outer profiles of the sectors 56 and 68 during rotation of the headrest 10 to the forward dump position (as well as manually induced and counter-biased upright retraction back to the design position). A coil shaped compression spring 90 seats within a rear side vertical channel (further seen at 92 in the rear perspective of FIG. 2) defined in the block shaped cam wedge 82, an upper end of the compression spring 90 abutting an inwardly projecting end stop (see at 94 in associated with inside of rear cover 14 and which is depicted in phantom in FIG. 2) and so that an opposite bottom end of the spring 90 biases against a lower end surface (at 96 in FIG. 2) of the channel 92 defined in the cam wedge 82, this in order to bias the cam wedge in a normally downward and engaged position against the flattened central profile 50 of the fixed pivot point defining rod 34.

As previously described, the present invention provides alternate protocols for effectuating elevation of the cam wedge 82 in unseating fashion from the pivot rod 34, with subsequent guided motion of the underside configured edges 86 and 86 of the cam wedge 82 along the arcuate outer profiles of the sectors 56 and 58 in the manner best depicted in FIGS. 6-10. A first of these protocols involves a tubular shaped housing 98 mounted to a side location of the housing (see as further defined by semicircular mating apertures 100 and 102 of the covers 12 and 14 in FIG. 3). A stem-shaped portion 104 (see again FIG. 3) is seated, in limited linearly displaceable fashion, within the open interior of the outer housing 98 and includes a flattened outer (button shaped) end 106 and an inner linearly displaceable and engaging end 108.

A release lever 110 exhibits a modified "L" or boomerang shape and is pivotally mounted, via a pin 112 in turn supported at aligning locations of the cover interiors, at a location in which a first upper facing profile surface 114 of the lever 110 is in contact with a projection 116 (see as best shown in FIG. 1) associated with a front face of the cam wedge 82. A torsion spring 118 seats over the pin 112 and includes a lower end 120 which engages the lever 110 and an upper end 122 (see also FIGS. 1 and 2) which engages the inner housing surfaces to bias the lever 110 in a clockwise 124 (FIG. 3) direction.

Upon inwardly displacing the stem-shaped portion 104, by pushing on the flattened button shaped end 106, causing the inner engaging or triggering end 108 to contact a further side disposed surface 126 of the lever 110, at which point continued inner displacement of the stem-shaped portion 104 rotates the lever 110 in a counter-clockwise direction, against its clockwise bias, and so that the upper surface 114 engages the projection 116 of the cam wedge 82 and forcibly elevates the cam wedge against the (downward) bias exerted by its compression spring 90. At this point, the underside edge profile 84 of the cam wedge 82 upwardly unseats from the flattened profile along the central portion 50 of the fixed pivot rod 32 (FIGS. 4-5), the underside edge locations 86 and 88 of the cam wedge 82 then guiding along the arcuate exterior profiles of the fixed sectors 56 and 58 (FIGS. 6-8) until such time as the housing secured rubberized abutment stops 78 and 80 rotate into contact with the rear flattened edges 74 and 76 of the sectors 56 and 58 (FIG. 8), defining a forward most dump rotation of the headrest.

Alternate to the side button actuating protocol, a separate cable exhibiting an outer sleeve 128 is provided and, as shown in the example of FIG. 3, passes through an interior of selected headrest tube 24 and in an overhead extending and reverse-looped fashion within the inner package defining space of the assembled housing (see as best shown in FIG. 1). An inner linearly displaceable or translating portion 130 extends from an end of the outer sleeve 128 and in turn terminates in a three dimensional shaped engagement portion 132 (depicted as a small cylinder shape) which seats within an open pocket defined in the projecting portion 116 of the cam wedge 82 (see again FIG. 1). For purposes of simplification, the present invention contemplates the end of the inner translating wire 130 engaging the cam wedge 82 in any fashion desired and so that the cam wedge 82 can be directly and upwardly displaced by a remote positioned latch (not shown) for triggering headrest dump, separately from the side disposed stem 104 and button 108 vertically actuating the cam wedge via counter-biasing motion exerted upon the spring biased lever 110.

Also depicted at 134 is a load dispersion plate which is generally angularly disposed and which is mounted to a lower inside location of the front cover 12. As further depicted, the load dispersion plate 134 rotates with the housing and, in combination with the architecture of the sectors 56 and 58, prevents chucking of the package assembly during both forward dump (FIGS. 4-8) and manual upright retraction (FIGS. 9-10).

Figure 5:
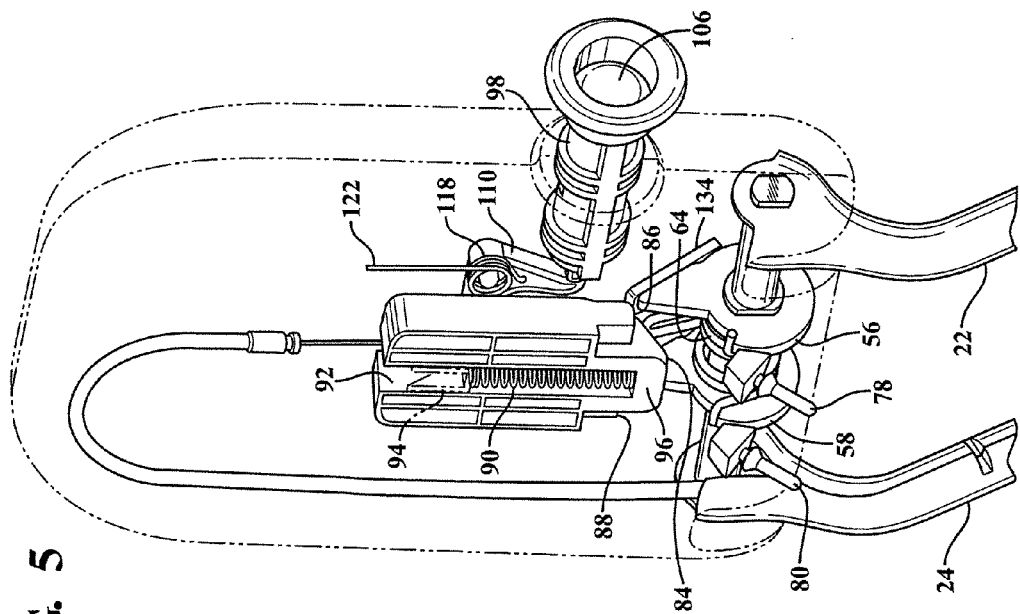
FIGS. 4 and 5 are front and rear perspectives of the headrest assembly and which concurrently depict each of a first actuating protocol established by inward displacement of a side housing mounted release button for triggering rotation of the lever in elevating fashion against the wedge block, as well as a second protocol established by upward displacement of the cam wedge by the overhead positioned and connecting cable.
Figure 4:
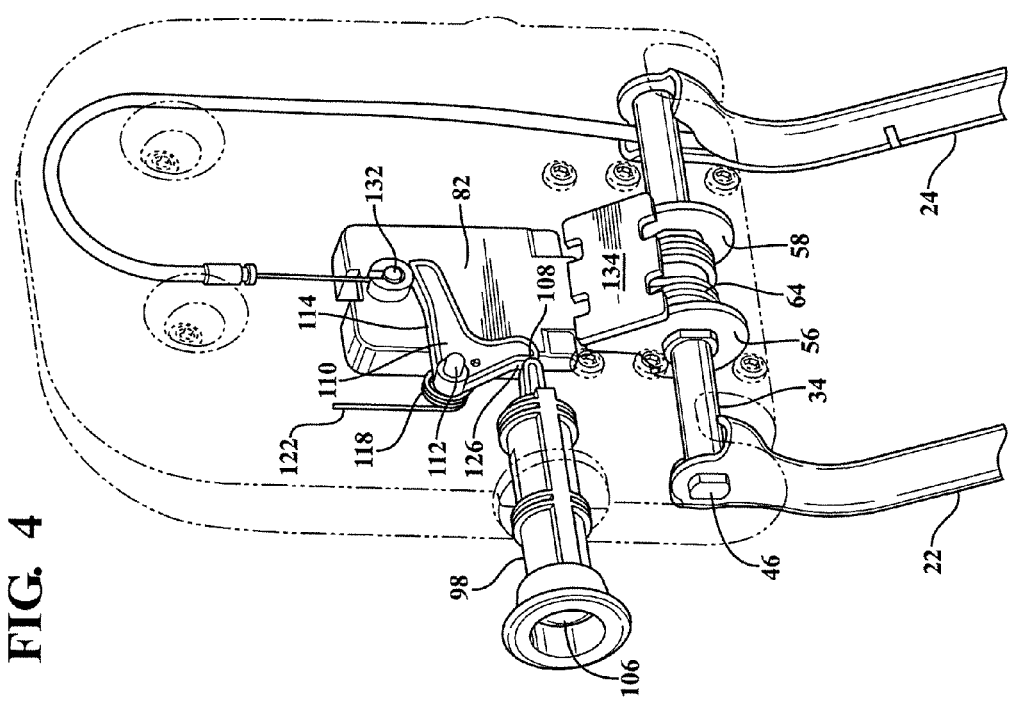

For ease of illustration, not all of the elements represented in FIGS. 1-3 are shown in every one of succeeding FIGS. 4-10. As previously described, FIGS. 4 and 5 depict front and rear perspectives of the headrest assembly and which concurrently depict each of a first actuating protocol established by inward displacement of a side housing mounted release button (again stem 104 and inner button end 108) for triggering rotation of the lever 110 in elevating fashion against the cam wedge (block) 82, as well as a second protocol established by upward displacement of the cam wedge 82 by the overhead positioned and connecting cable 128.

Figure 6:
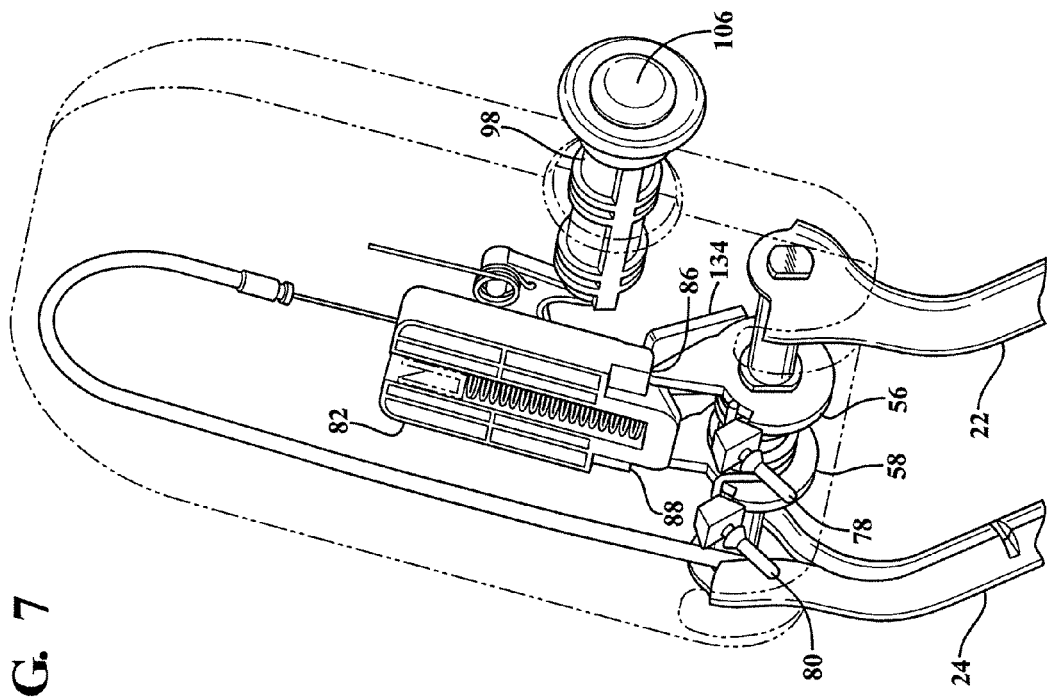
FIGS. 6 and 7 are succeeding front and rear perspectives of the headrest assembly in an intermediate forward dumping position, and in which a pair of sectors mounted to the fixed pivot rod provide guided support to underside locations of the cam wedge.
Figure 7:
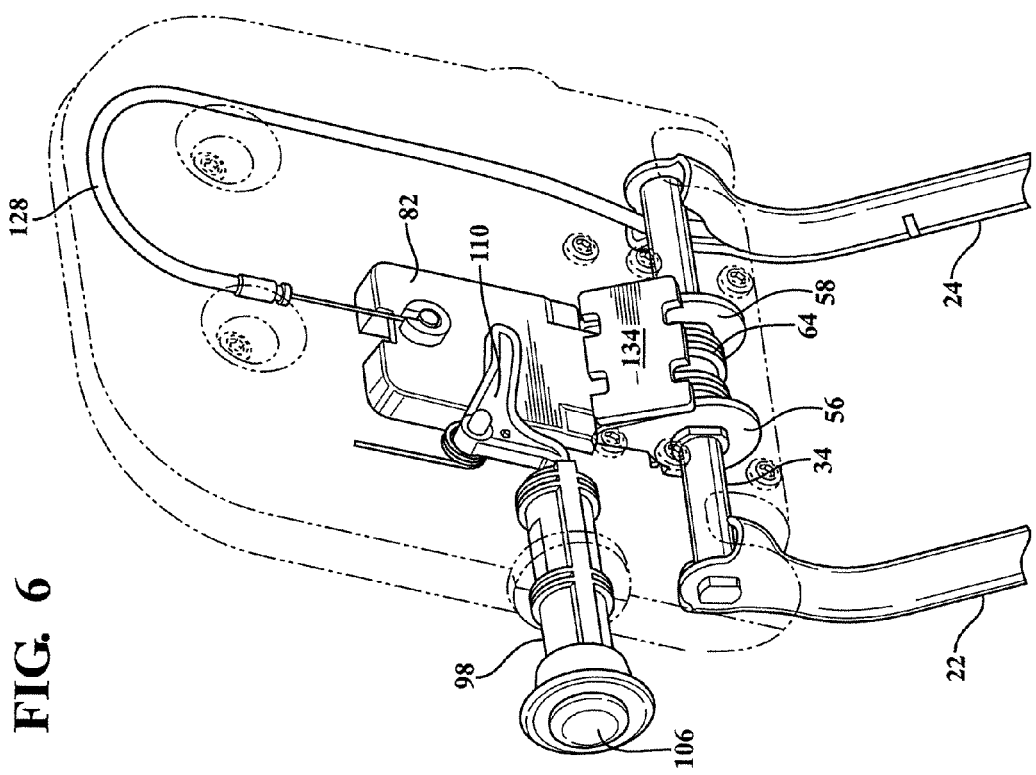

FIGS. 6 and 7 are succeeding front and rear perspectives of the headrest assembly in an intermediate forward dumping position, and in which the pair of sectors 56 and 58, mounted to the fixed pivot rod 34, provide guided support to underside locations 86 and 88 of the cam wedge 82. FIG. 8 again depicts a rear perspective of the headrest assembly in fully forward rotated dump position in which the flat rear surface 74 and 76 of each sector 56 and 58 further defines an abutment stop when contacted by the upper end faces 79 and 81 of the pair of rubberized or otherwise force absorbing mounting portions 78 and 80, which are again in turn secured in pivotal fashion to such as the rear cover portion 14 of the package defining housing.

Figure 9:
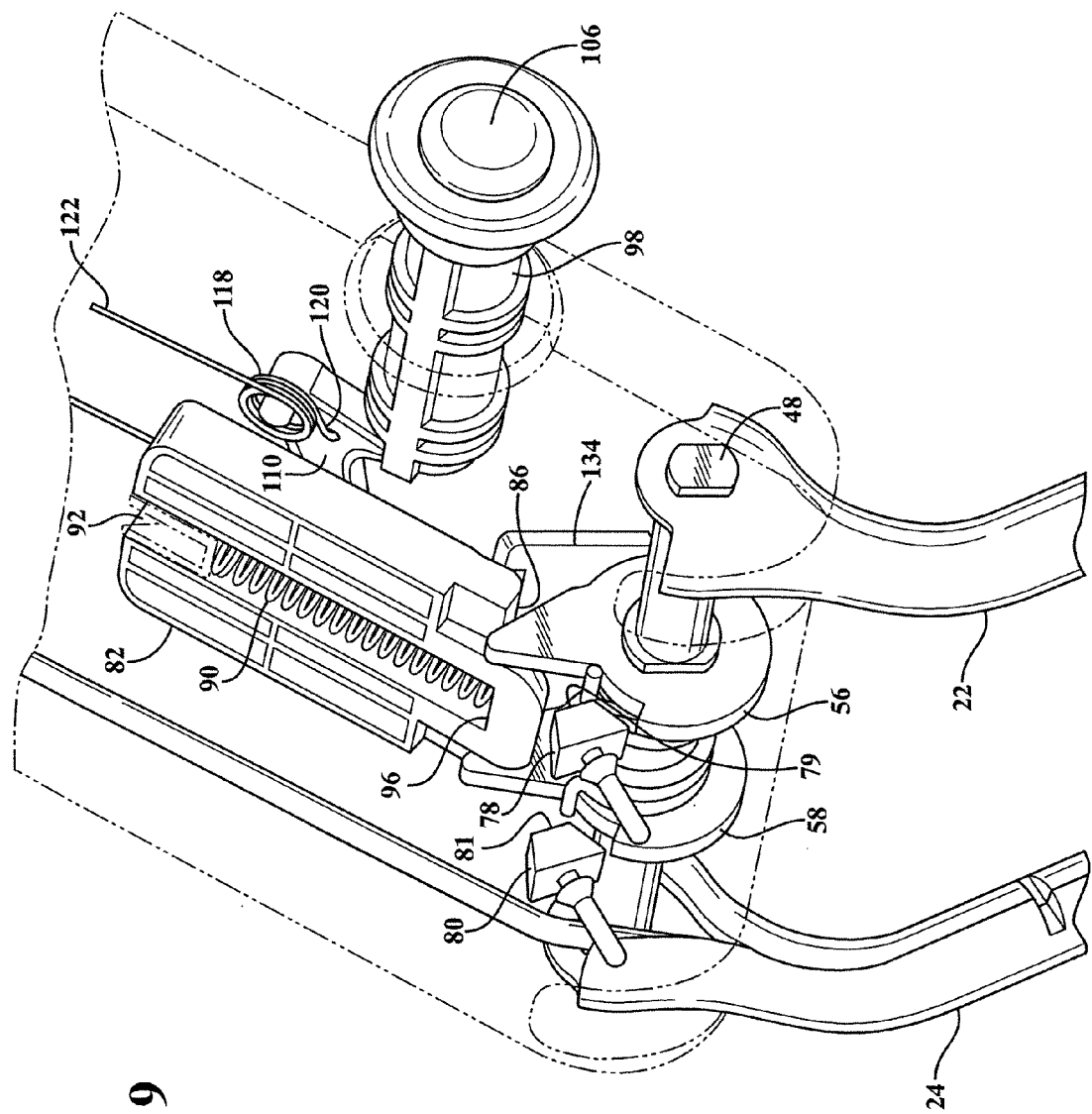
FIG. 9 is a succeeding view to FIG. 8 and illustrating an intermediate manual (upright) retracting position of the headrest against the main torsion spring bias.
Figure 10:
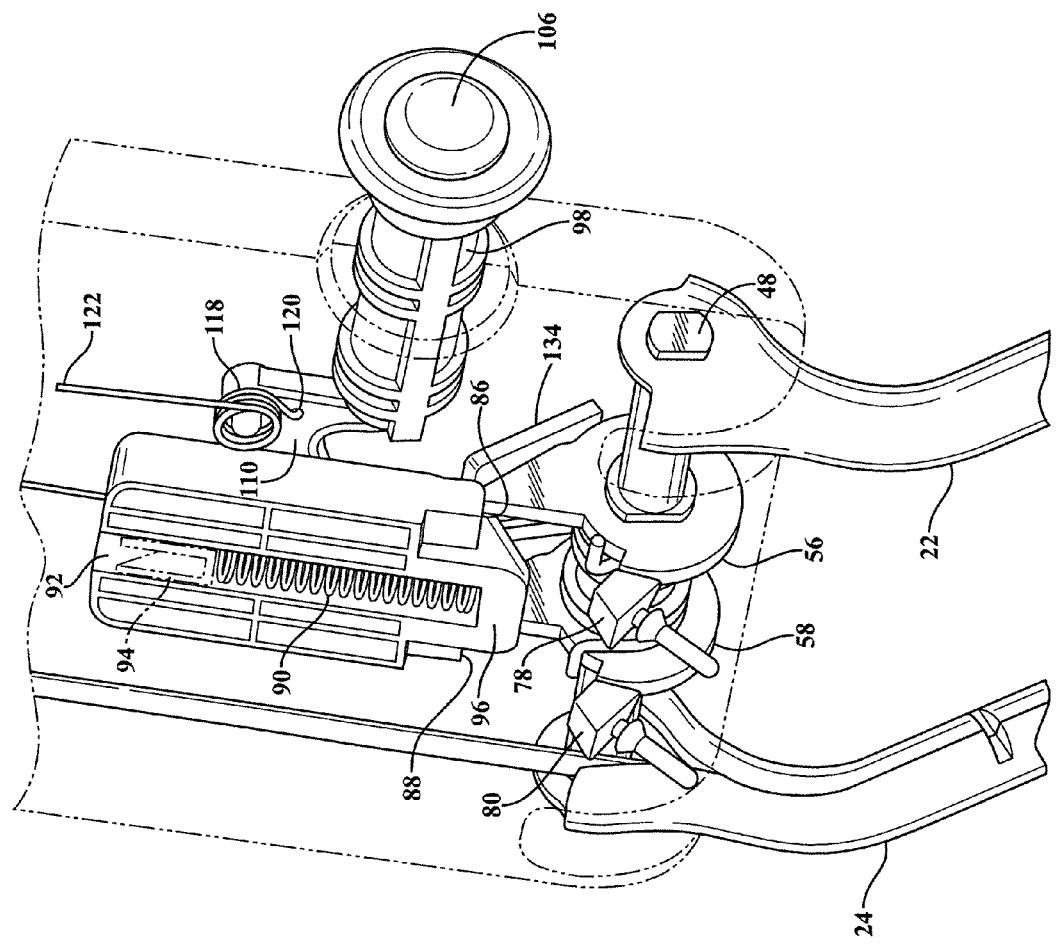
FIG. 10 is a further succeeding upright rotating view of the headrest assembly depicted from the perspective of FIGS. 8 and 9 and prior to downward resetting of the cam wedge lower profile against the flattened inner seating surface defined along the central portion of the main pivot rod.

Additional steps causing upright manual reset of the headrest assembly are again depicted in FIGS. 9 and 10 and include the user applying a counter bias rotating force to the surrounding headrest bun (this countering the force exerted by the main torsion spring 64). Finally, at FIG. 10, a succeeding upright rotating view of the headrest assembly is depicted by the underside locations 86 and 88 of the cam wedge 82 passing rearwardly beyond the arcuate surfaces of the sectors 56 and 58 and dropping vertically (along with the cam wedge 82) in guided fashion along the vertical flattened surfaces 74 and 76 of the sectors, during resetting of the lower profile 84 of the cam wedge 82 against the flattened inner seating surface defined along the central portion 50 of the main pivot rod 34.

Having described my invention, other and additional preferred embodiments will become apparent to those skilled in the art to which it pertains, and without deviating from the scope of the appended claims.

I claim:

1. An assembly embedded into a headrest bun for permitting rotation of the bun between upright design and forward dump positions, said assembly comprising:
   a pair of tubes extending upwardly from a seatback frame, a fixed pivot rod extending between said tubes;
   a housing defining a package containing interior and including a pair of front and rear covers assembleable around said fixed pivot rod;
   a block shaped cam wedge displaceably supported within said interior and biased in a first direction in seating fashion against an abutting location of said fixed rod;
   said cam wedge further including a lower profile edge which, in a downwardly biased position, contacts an inside flattened profile depicted along a central area of said pivot rod, said cam wedge further having a pair of underside configured and side edge proximate locations configured to seat against and slide along arcuate outer profiles of said sectors during each of rotation of the headrest to the forward dump position and manually induced and counter-biased upright retraction back to the design position; and
   an actuating mechanism for elevating said cam wedge to unseat from said pivot rod, said housing subsequently rotating from the design position to the forward dump position.

2. The assembly as described in claim 1, further comprising upper ends of said tubes seating through underside accessible arcuate channels defined in said assembleable covers, permitting said housing to rotate relative to said pivot rod.

3. The assembly as described in claim 1, further comprising a pair of sectors mounting to said pivot rod, a torsion spring seated over a central portion of said pivot rod and captured between said sectors, such that angled ends of said spring engage abutment shoulders configured upon said sectors.

4. The assembly as described in claim 3, further comprising a load dispersion plate which is generally angularly disposed and which is mounted to a lower inside location of a selected interior package defining cover such that said plate rotates with the housing and, in combination with said sectors, prevents chucking of the package assembly during both forward dump and manual upright retraction.

5. The assembly as described in claim 3, said sectors further comprising flat rear surfaces defining abutment stops when contacted by a pair of rubberized force absorbing mounting portions, in turn secured in angled fashion to said rear cover portion of said package defining housing so that generally planar shaped pad ends of said force absorbing portions rotate with the forwardly dumping headrest until contacting said flat rear surfaces of said sectors.

6. The assembly as described in claim 1, further comprising a coil shaped compression spring seating within a rear side vertical channel defined in said cam wedge, an upper end of said compression spring abutting an inwardly projecting end stop associated with said package defined interior and so that an opposite bottom end of said spring biases against a lower end surface of said channel defined in said cam wedge in order to bias said cam wedge in a normally downward and engaged position against said flattened central profile of said fixed pivot rod.

7. The assembly as defined in claim 1, said actuating mechanism further comprising:
a tubular shaped housing mounted to a side location of said package defining housing, a stem-shaped portion being seated in limited linearly displaceable fashion within an open interior of the outer tubular housing and including a flattened outer button depressing end and an inner engaging end;
a release lever exhibiting a modified "L" shape and being pivotally mounted by a pin within said package defined interior at a location in which a generally upper facing profile surface of said lever is in contact with a location projecting from a front face of said cam wedge;
a torsion spring seating over said pin and including a lower end which engages said lever, an upper end of said spring engaging a surface of the package defined interior to bias said lever away from said projecting location; and
upon inwardly displacing said stem-shaped portion said inner end contacting a further side disposed surface of said lever, at which point continued inner displacement of said stem portion rotates said lever against its bias and so that said upper lever surface engages the projecting portion of said cam wedge and forcibly elevates said cam wedge against said bias exerted by its compression spring.

8. The assembly as defined in claim 1, said actuating mechanism further comprising:
a cable exhibiting an outer sleeve extending in an overhead extending and reverse-looped fashion within said package containing interior of said assembled housing;
an inner linearly displaceable portion extending from an end of said outer sleeve and in turn engaging said projection upon said cam wedge; and
said block shaped cam wedge is a remotely positioned, vertically actuating cam wedge for triggering rotation of said headrest to the dump position.

9. An assembly embedded into a headrest bun for permitting rotation of the bun between upright design and forward dump positions, said assembly comprising:
a pair of tubes extending upwardly from a seatback frame, a fixed pivot rod extending between said tubes;
a pair of sectors mounting to said pivot rod, a torsion spring seated over a central portion of said pivot rod and captured between said sectors, such that angled ends of said spring engage abutment shoulders configured upon said sectors;
a housing defining a package containing interior and including a pair of front and rear covers assembleable around said fixed pivot rod;
a block shaped cam wedge displaceably supported within said interior and biased in a first direction in seating fashion against an abutting location of said fixed rod; and
an actuating mechanism for elevating said cam wedge to unseat from said pivot rod, said housing subsequently rotating from the design position to the forward dump position.

10. The assembly as described in claim 9, said sectors further comprising flat rear surfaces defining abutment stops when contacted by a pair of rubberized force absorbing mounting portions, in turn secured in angled fashion to said rear cover portion of said package defining housing so that generally planar shaped pad ends of said force absorbing portions rotate with the forwardly dumping headrest until contacting said flat rear surfaces of said sectors.

11. The assembly as described in claim 9, said cam wedge further comprising a lower profile edge which, in a downwardly biased position, contacts an inside flattened profile depicted along a central area of said pivot rod, said cam wedge further having a pair of underside configured and side edge proximate locations configured to seat against and slide along arcuate outer profiles of said sectors during each of a rotation of the headrest to the forward dump position and a further manually induced and counter-biased upright rotation of the headrest back to the design position.

12. The assembly as described in claim 11, further comprising a coil shaped compression spring seating within a rear side vertical channel defined in said cam wedge, an upper end of said compression spring abutting an inwardly projecting end stop associated with said package defined interior and so that an opposite bottom end of said spring biases against a lower end surface of said channel defined in said cam wedge in order to bias said cam wedge in a normally downward and engaged position against said flattened central profile of said fixed pivot rod.

13. The assembly as defined in claim 9, said actuating mechanism further comprising:
a tubular shaped housing mounted to a side location of said package containing interior, a stem-shaped portion being seated in limited linearly displaceable fashion within an open interior of the outer tubular housing and including a flattened outer button depressing end and an inner engaging end;
a release lever exhibiting a modified "L" shape and being pivotally mounted by a pin within said package defined interior at a location in which a generally upper facing profile surface of said lever is in contact with a location projecting from a front face of said cam wedge;
a torsion spring seating over said pin and including a lower end which engages said lever, an upper end of said spring engaging a surface of the package defined interior to bias said lever away from said projecting location; and
upon inwardly displacing said stem-shaped portion said inner end contacting a further side disposed surface of said lever, at which point continued inner displacement of said stem-shaped portion rotates said lever against its bias and so that said upper lever surface engages said projecting location of said cam wedge and forcibly elevates said cam wedge against said bias exerted by its compression spring.

14. The assembly as defined in claim 9, said actuating mechanism further comprising:
a cable exhibiting an outer sleeve extending in an overhead extending and reverse-looped fashion within said package containing interior of said assembled housing;
an inner linearly displaceable portion extending from an end of said outer sleeve and in turn engaging said projection upon said cam wedge; and said block shaped cam wedge is a remotely positioned, vertically actuating cam wedge for triggering rotation of said headrest to the dump position.

15. The assembly as described in claim 9, further comprising a load dispersion plate which is generally angularly disposed and which is mounted to a lower inside location of a selected interior package defining cover such that said plate rotates with the housing and, in combination with said sectors, prevents chucking of the package assembly during both forward dump and manual upright retraction.

16. An assembly embedded into a headrest bun for permitting rotation of the bun between upright design and forward dump positions, said assembly comprising:
   a pair of tubes extending upwardly from a seatback frame, a fixed pivot rod extending between said tubes;
   a housing defining a package containing interior and including a pair of front and rear covers assembleable around said fixed pivot rod;
   a block shaped cam wedge displaceably supported within said interior and biased in a first direction in seating fashion against an abutting location of said fixed rod;
   an actuating mechanism for elevating said cam wedge to unseat from said pivot rod, said housing subsequently rotating from the design position to the forward dump position;
   said actuating mechanism further having a tubular shaped housing mounted to a side location of said package defining housing, a stem-shaped portion being seated in limited linearly displaceable fashion within an open interior of the outer tubular housing and including a flattened outer button depressing end and an inner engaging end;
   a release lever exhibiting a modified "L" shape and being pivotally mounted by a pin within said package defined interior at a location in which a generally upper facing profile surface of said lever is in contact with a location projecting from a front face of said cam wedge;
   a torsion spring seating over said pin and including a lower end which engages said lever, an upper end of said spring engaging a surface of the package defined interior to bias said lever away from said projecting location; and
   upon inwardly displacing said stem-shaped portion said inner end contacting a further side disposed surface of said lever, at which point continued inner displacement of said stem-shaped portion rotates said lever against its bias and so that said upper lever surface engages said projecting location of said cam wedge and forcibly elevates said cam wedge against said bias exerted by its compression spring.

17. The assembly as described in claim 16, said cam wedge further comprising a lower profile edge which, in a downwardly biased position, contacts an inside flattened profile depicted along a central area of said pivot rod, said cam wedge further having a pair of underside configured and side edge proximate locations configured to seat against and slide along arcuate outer profiles of said sectors during each of a rotation of the headrest to the forward dump position and a further manually induced and counter-biased upright rotation of the headrest back to the design position.

18. The assembly as described in claim 17, further comprising a coil shaped compression spring seating within a rear side vertical channel defined in said cam wedge, an upper end of said compression spring abutting an inwardly projecting end stop associated with said package defined interior and so that an opposite bottom end of said spring biases against a lower end surface of said channel defined in said cam wedge in order to bias said cam wedge in a normally downward and engaged position against said flattened central profile of said fixed pivot rod.

19. The assembly as defined in claim 16, said actuating mechanism further comprising:
   a cable exhibiting an outer sleeve extending in an overhead extending and reverse-looped fashion within said package containing interior of said assembled housing;
   an inner linearly displaceable portion extending from an end of said outer sleeve and in turn engaging said projection upon said cam wedge; and
   said block shaped cam wedge is a remotely positioned, vertically actuating cam wedge for triggering rotation of said headrest to the dump position.

20. An assembly embedded into a headrest bun for permitting rotation of the bun between upright design and forward dump positions, said assembly comprising:
   a pair of tubes extending upwardly from a seatback frame, a fixed pivot rod extending between said tubes;
   a housing defining a package containing interior and including a pair of front and rear covers assembleable around said fixed pivot rod;
   a block shaped cam wedge displaceably supported within said interior and biased in a first direction in seating fashion against an abutting location of said fixed rod;
   an actuating mechanism for elevating said cam wedge to unseat from said pivot rod, said housing subsequently rotating from the design position to the forward dump position;
   said actuating mechanism further including:
   a tubular shaped housing mounted to a side location of said package defining housing a stem-shaped portion being seated in limited linearly displaceable fashion within an open interior of the outer tubular housing and including a flattened outer button depressing end and an inner engaging end;
   a release lever exhibiting a modified "L" shape and being pivotally mounted by a pin within said package defined interior at a location in which a generally upper facing profile surface of said lever is in contact with a location projecting from a front face of said cam wedge;
   a torsion spring seating over said pin and including a lower end which engages said lever, an upper end of said spring engaging a surface of the package defined interior to bias said lever away from said projecting location; and
   upon inwardly displacing said stem-shaped portion said inner end contacting a further side disposed surface of said lever, at which point continued inner displacement of said stem portion rotates said lever against its bias and so that said upper lever surface engages the projecting portion of said cam wedge and forcibly elevates said cam wedge against said bias exerted by its compression spring.

21. An assembly embedded into a headrest bun for permitting rotation of the bun between upright design and forward dump positions, said assembly comprising:
   a pair of tubes extending upwardly from a seatback frame, a fixed pivot rod extending between said tubes;
   a housing defining a package containing interior and including a pair of front and rear covers assembleable around said fixed pivot rod;
   a block shaped cam wedge displaceably supported within said interior and biased in a first direction in seating fashion against an abutting location of said fixed rod;

an actuating mechanism for elevating said cam wedge to unseat from said pivot rod, said housing subsequently rotating from the design position to the forward dump position;

said actuating mechanism further including:

a cable exhibiting an outer sleeve extending in an overhead extending and reverse-looped fashion within said package containing interior of said assembled housing;

an inner linearly displaceable portion extending from an end of said outer sleeve and in turn engaging said projection upon said cam wedge; and said block shaped cam wedge is a remotely positioned, vertically actuating cam wedge for triggering rotation of said headrest to the dump position.

\* \* \* \* \*